US011270162B2

(12) United States Patent
Viswanathan

(10) Patent No.: US 11,270,162 B2
(45) Date of Patent: Mar. 8, 2022

(54) METHOD AND APPARATUS FOR DETECTING OBJECTS OF INTEREST IN AN ENVIRONMENT

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 235 days.

(21) Appl. No.: 16/174,866

(22) Filed: Oct. 30, 2018

(65) Prior Publication Data

US 2020/0134378 A1 Apr. 30, 2020

(51) Int. Cl.
*G06K 9/62* (2006.01)
*G06T 7/70* (2017.01)
*G06K 9/00* (2006.01)
*G05D 1/00* (2006.01)
(Continued)

(52) U.S. Cl.
CPC ......... *G06K 9/6257* (2013.01); *G05D 1/0088* (2013.01); *G05D 1/0253* (2013.01); *G06K 9/00818* (2013.01); *G06K 9/6253* (2013.01); *G06K 9/6263* (2013.01); *G06T 7/70* (2017.01); *G06F 16/5854* (2019.01); *G06T 2207/30252* (2013.01)

(58) Field of Classification Search
CPC ........... G06K 9/00791; G06K 9/00818; G06K 9/00637; G06K 9/6257; G06K 9/6253; G06K 9/6263; G06T 7/70; G06T 2207/30252; G05D 1/0088; G05D 1/0246; G05D 1/0253; G05D 2201/0213; G06F 16/5854
See application file for complete search history.

(56) References Cited

U.S. PATENT DOCUMENTS

| | | | |
|---|---|---|---|
| 7,356,164 B2 | 4/2008 | Aliaga et al. | |
| 7,804,424 B2 * | 9/2010 | Iwane | G01C 21/36 340/916 |
| 9,002,055 B2 | 4/2015 | Funayama et al. | |
| (Continued) | | | |

OTHER PUBLICATIONS

Badrinarayanan, V. et al., *Lablel Propagation in Video Sequences*, Conference Paper in Proceedings/CVPR, IEEE Computer Society Conference on Computer vision and Pattern Recognition (Jun. 2010) 8 pages.

(Continued)

*Primary Examiner* — Nay A Maung
*Assistant Examiner* — Jose M Torres
(74) *Attorney, Agent, or Firm* — Alston & Bird LLP

(57) ABSTRACT

A method is provided for generating training data to facilitate automatically locating an object of interest within an image. Methods may include: receiving sensor data including a plurality of images from at least one image sensor; receiving an identification, from a user, of an object visible within an image of the plurality of images, where at least a portion of the object is visible in one or more of the plurality of images; determining a predicted location of the object in the one or more of the remaining images of the plurality of images; identifying the object in the one or more of the remaining images of the plurality of images; and storing the plurality of images including an indication of the object at the object location within the one or more of the plurality of images.

20 Claims, 6 Drawing Sheets

(51) Int. Cl.
   *G05D 1/02* (2020.01)
   *G06F 16/583* (2019.01)

(56) References Cited

U.S. PATENT DOCUMENTS

| | | | |
|---|---|---|---|
| 9,165,204 B2 | 10/2015 | Othmezouri et al. | |
| 2004/0205482 A1 | 10/2004 | Basu et al. | |
| 2014/0172290 A1* | 6/2014 | Prokhorov | G01C 21/28 |
| | | | 701/408 |
| 2015/0161441 A1* | 6/2015 | Robinson | G06K 9/00791 |
| | | | 382/113 |
| 2015/0234045 A1* | 8/2015 | Rosenblum | G01S 13/86 |
| | | | 342/71 |
| 2016/0161602 A1* | 6/2016 | Prokhorov | G01S 7/4026 |
| | | | 702/97 |
| 2016/0189004 A1* | 6/2016 | Anastassov | G06K 9/6215 |
| | | | 382/113 |
| 2017/0206440 A1* | 7/2017 | Schrier | G05D 1/021 |
| 2017/0337435 A1* | 11/2017 | Uliyar | G08G 1/0129 |
| 2017/0364733 A1* | 12/2017 | Estrada | G06N 3/0454 |
| 2018/0173973 A1* | 6/2018 | Hattori | G06K 9/6227 |
| 2018/0188027 A1* | 7/2018 | Zhang | G06T 7/55 |
| 2019/0180502 A1* | 6/2019 | Englard | G01S 7/40 |
| 2019/0377965 A1* | 12/2019 | Totolos, Jr. | G06K 9/6271 |
| 2019/0392268 A1* | 12/2019 | Tariq | G06K 9/00791 |
| 2020/0125845 A1* | 4/2020 | Hess | G05D 1/0246 |

OTHER PUBLICATIONS

Caelles, S. et al., *One-Shot Video Object Segmentation* [online] [retrieved Jan. 10, 2019]. Retrieved from the Internet: <URL:https://arxiv.org/pdf/1611.05198.pdf>, (Apr. 13, 2017) 10 pages.

Pstras, I. et al., *Semi-Automatic Object-Based Video Segmentation With Labeling of Color Segments*, Signal Processing Image Communication 18 (2003) 51-65.

* cited by examiner

METHOD AND APPARATUS FOR DETECTING OBJECTS OF INTEREST IN AN ENVIRONMENT

TECHNOLOGICAL FIELD

Example embodiments of the present invention relate generally to automatically detecting objects of interest in an environment, and more particularly, to generating training data for a perception system in order to reliably and repeatably detect objects of interest in an environment automatically.

BACKGROUND

Road geometry modelling is very useful for map creation and identification of objects of interest in environments, such as road signs along a road segment. Such object identification may facilitate autonomous vehicle navigation along a prescribed path. Traditional methods for modelling of road geometry and object or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Some current methods rely upon feature detection from image data to perform object identification, but these methods have deficiencies. For instance, some systems designed for object detection/identification around a vehicle exist, but may be unreliable. Further, the reliability of object detection may not be known such that erroneous object detection or lack of object detection may adversely impact autonomous or semi-autonomous driving. Over-estimating the accuracy of object detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in an environment.

BRIEF SUMMARY

Accordingly, a method, apparatus, and computer program product are provided for automatically detecting objects of interest in an environment, and more particularly, to generating training data for a perception system in order to reliably and repeatably detect objects of interest in an environment automatically. In a first example embodiment, an apparatus is provided including at least one processor and at least one memory including computer program code. The at least one memory and the computer program code may be configured to, with the at least one processor, cause the apparatus to: receive sensor data from at least one image sensor, where the sensor data is representative of a plurality of images, and each image is associated with sensor position data; receive an identification from a user of an object visible within an image of the plurality of images, where at least a portion of the object is visible in one or more of the remaining images of the plurality of images; determine a predicted location of the object in the one or more of the remaining images of the plurality of images based, at least in part, on the sensor position data of the respective image; identify the object in the one or more of the remaining images of the plurality of images based, at least in part, on the predicted location of the object in the one or more of the remaining images of the plurality of images and image feature analysis; store the plurality of images including an indication of the object at the object location within the one or more of the plurality of images; and identify an object in a subsequent image automatically based, at least in part, on machine learning from the plurality of stored images.

The sensor position data of example embodiments may include at least one of visual odometry or actual odometry from at least one sensor of the vehicle. Causing the apparatus to identify the object in one or more of the remaining images of the plurality of images based, at least in part, on the predicted location of the object in the one or more of the remaining images of the plurality of images and image feature analysis comprises causing the apparatus to identify the object location in the one or more of the remaining plurality of images based on at least one of visual odometry or actual odometry from at least one sensor of the vehicle. The apparatus of some embodiments may be caused to receive an indication of a correction, from the user, of the location of the object within at least one of the plurality of images relative to the predicted location of the object in the at least one of the plurality of images, where causing the apparatus to store the plurality of images including an indication of the object at the object location within the one or more of the plurality of images includes causing the apparatus to store the at least one of the plurality of images including an indication of the object at the corrected location within the at least one of the plurality of images.

An apparatus of example embodiments may be caused to facilitate autonomous control of a vehicle based on identification of an object in a subsequent image automatically based, at least in part, on machine learning from the plurality of images. The at least one image sensor may be associated with a vehicle traveling along a road segment, where the object includes a road sign along the road segment. The road sign may include information regarding travel restrictions along the road segment, where the apparatus may be caused to provide for autonomous control of the vehicle based, at least in part, on the information of the road sign.

Embodiments disclosed herein may provide a computer program product including at least one non-transitory computer-readable storage medium having computer-executable program code instructions stored therein. The computer-executable program code instructions may include program code instructions to: receive sensor data from at least one image sensor, where the sensor data may be representative of a plurality of images, and each image is associated with sensor position data; receive an identification, from a user, of an object visible within an image of the plurality of images, where at least a portion of the object is visible in one or more of the remaining images of the plurality of images; determine a predicted location of the object in the one or more of the remaining images of the plurality of images based, at least in part, on the sensor position data of the respective image; identify the object in the one or more of the remaining images of the plurality of images based, at least in part, on the predicted location of the object in the one or more of the remaining images of the plurality of images and image feature analysis; store the plurality of images including an indication of the object at the object location within the one or more of the plurality of images; and identify an object in a subsequent image automatically based, at least in part, on machine learning from the plurality of stored images.

The sensor position data may include at least one of visual odometry or actual odometry from at least one sensor of the vehicle. The program code instructions to identify the object in one or more of the remaining images of the plurality of images based, at least in part, on the predicted location of the object in the one or more of the remaining images of the plurality of images and image feature analysis may include program code instructions to identify the object location in the one or more of the remaining images of the plurality of images based on at least one of visual odometry or actual odometry from at least one sensor of the vehicle. The computer program product of some embodiments may include program code instructions to receive an indication of a correction, from the user, of the location of the object within at least one of the plurality of images relative to the predicted location of the object in the at least one of the plurality of images, where the program code instructions to store the plurality of images including an indication of the object at the object location within the one or more of the plurality of images includes program code instructions to store the at least one of the plurality of images including an indication of the object at the corrected location within the at least one of the plurality of images.

The computer program product of an example embodiment may include program code instructions to facilitate autonomous control of a vehicle based on identification of an object in a subsequent image automatically based, at least in part, on machine learning from the plurality of images. The at least one image sensor may be associated with a vehicle traveling along a road segment, where the object may include a road sign along the road segment. The road sign may include information relating to travel restrictions along the road segment, where the computer program product may include program code instructions to provide for autonomous vehicle control based, at least in part, on the information of the road sign.

Embodiments provided herein may include a method for generating training data to facilitate automatically locating an object of interest within an image. Methods may include: receiving sensor data from at least one image sensor, where the sensor data is representative of a plurality of images, and each image is associated with sensor position data; receiving an identification, from a user, of an object visible within an image of the plurality of images, where at least a portion of the object is visible in one or more of the remaining images of the plurality of images; determining a predicted location of the object in the one or more of the remaining images of the plurality of images based, at least in part, on the sensor position data of the respective images; identifying the object in the one or more of the remaining images of the plurality of images based, at least in part, on the predicted location of the object in the one or more of the remaining images of the plurality of images and feature analysis; storing the plurality of images including an indication of the object at the object location within the one or more of the plurality of images; and identifying an object in a subsequent image automatically based, at least in part, on machine learning from the plurality of stored images.

The sensor position data may include at least one of visual odometry or actual odometry from at least one sensor of the vehicle. Identifying the object in one or more of the remaining images of the plurality of images based, at least in part, on the predicted location of the object in the one or more of the remaining images of the plurality of images and image feature analysis may include identifying the object location in the one or more of the remaining images of the plurality of images based on at least one of visual odometry or actual odometry from at least one sensor of the vehicle. Methods may include receiving an indication of a correction, from the user, of the location of the object within at least one of the plurality of images relative to the predicted location of the object in the at least one of the plurality of images, where storing the plurality of images including an indication of the object at the object location within the one or more of the plurality of images may include storing the at least one of the plurality of images including an indication of the object at the corrected location within the at least one of the plurality of images.

Methods may include facilitating autonomous control of a vehicle based on identification of an object in a subsequent image automatically based, at least in part, on machine learning from the plurality of images. The at least one image sensor may be associated with a vehicle traveling along a road segment, where the object may include a road sign along the road segment. The road sign may include information relating to travel restrictions along the road segment, where a method may include providing for autonomous control of the vehicle based, at least in part, on the information of the road sign.

Embodiments provided herein may include an apparatus. An example apparatus may include: means for receiving sensor data from at least one image sensor, where the sensor data is representative of a plurality of images, and each image is associated with sensor position data; means for means for receiving an identification, from a user, of an object visible within an image of the plurality of images, where at least a portion of the object is visible in one or more of the remaining images of the plurality of images; means for determining a predicted location of the object in the one or more of the remaining images of the plurality of images based, at least in part, on the sensor position data of the respective images; means for identifying the object in the one or more of the remaining images of the plurality of images based, at least in part, on the predicted location of the object in the one or more of the remaining images of the plurality of images and feature analysis; means for storing the plurality of images including an indication of the object at the object location within the one or more of the plurality of images; and means for identifying an object in a subsequent image automatically based, at least in part, on machine learning from the plurality of stored images.

The sensor position data may include at least one of visual odometry or actual odometry from at least one sensor of the vehicle. The means for identifying the object in one or more of the remaining images of the plurality of images based, at least in part, on the predicted location of the object in the one or more of the remaining images of the plurality of images and image feature analysis may include means for identifying the object location in the one or more of the remaining images of the plurality of images based on at least one of visual odometry or actual odometry from at least one sensor of the vehicle. The apparatus may include means for receiving an indication of a correction, from the user, of the location of the object within at least one of the plurality of images relative to the predicted location of the object in the at least one of the plurality of images, where storing the plurality of images including an indication of the object at the object location within the one or more of the plurality of images may include storing the at least one of the plurality of images including an indication of the object at the corrected location within the at least one of the plurality of images.

An example apparatus may include means for facilitating autonomous control of a vehicle based on identification of an object in a subsequent image automatically based, at least in part, on machine learning from the plurality of images.

The at least one image sensor may be associated with a vehicle traveling along a road segment, where the object may include a road sign along the road segment. The road sign may include information relating to travel restrictions along the road segment, where an apparatus may include means for providing for autonomous control of the vehicle based, at least in part, on the information of the road sign.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
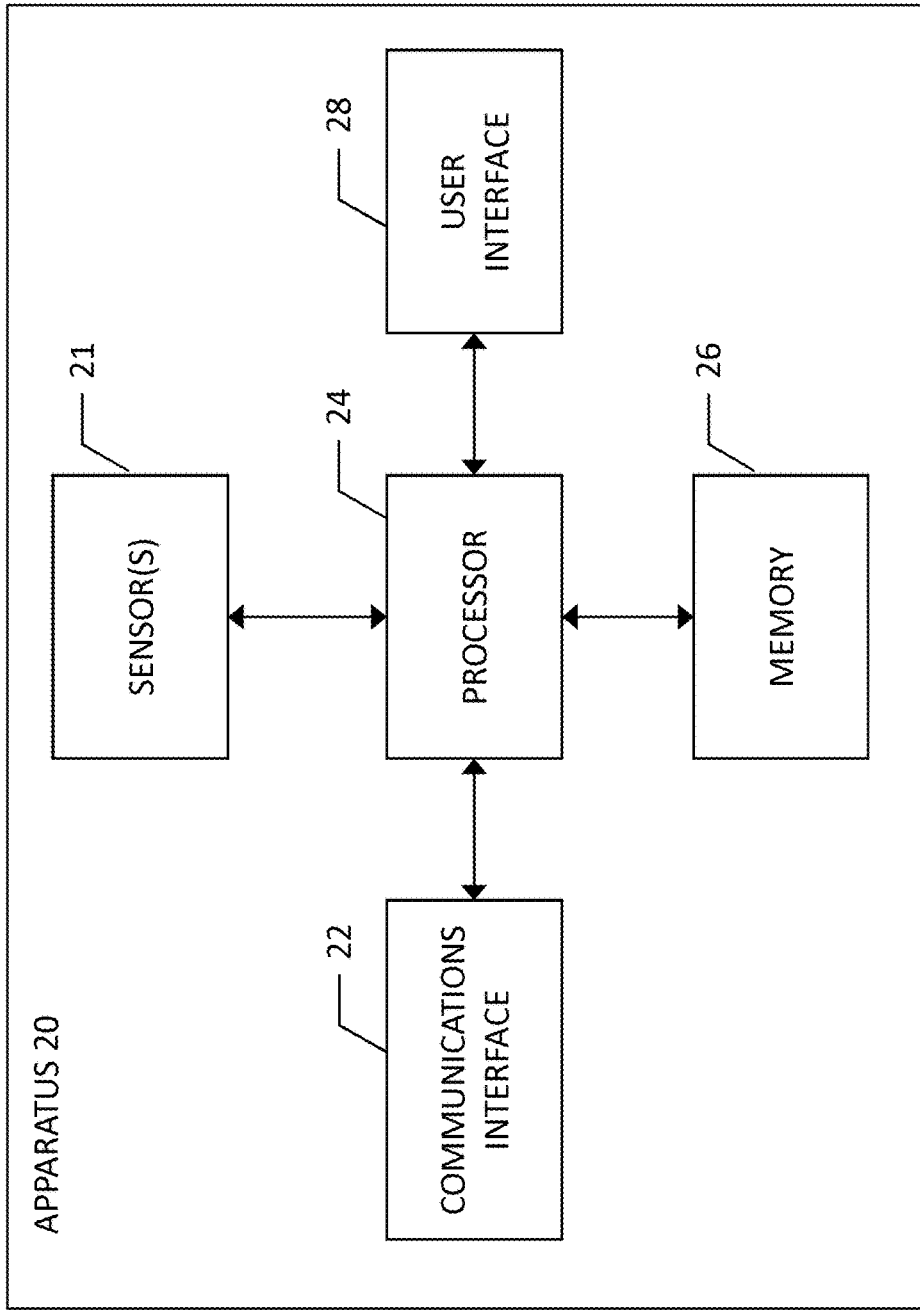
Figure 2:
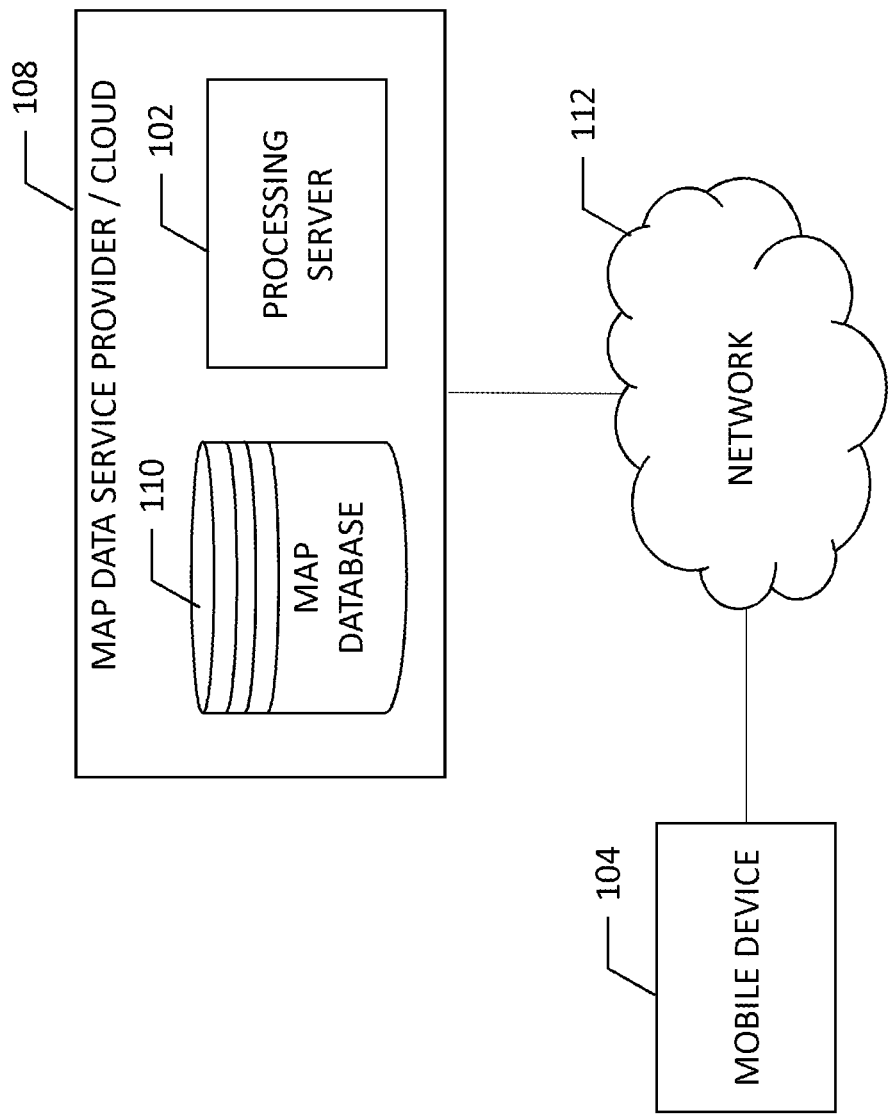
Figure 3:
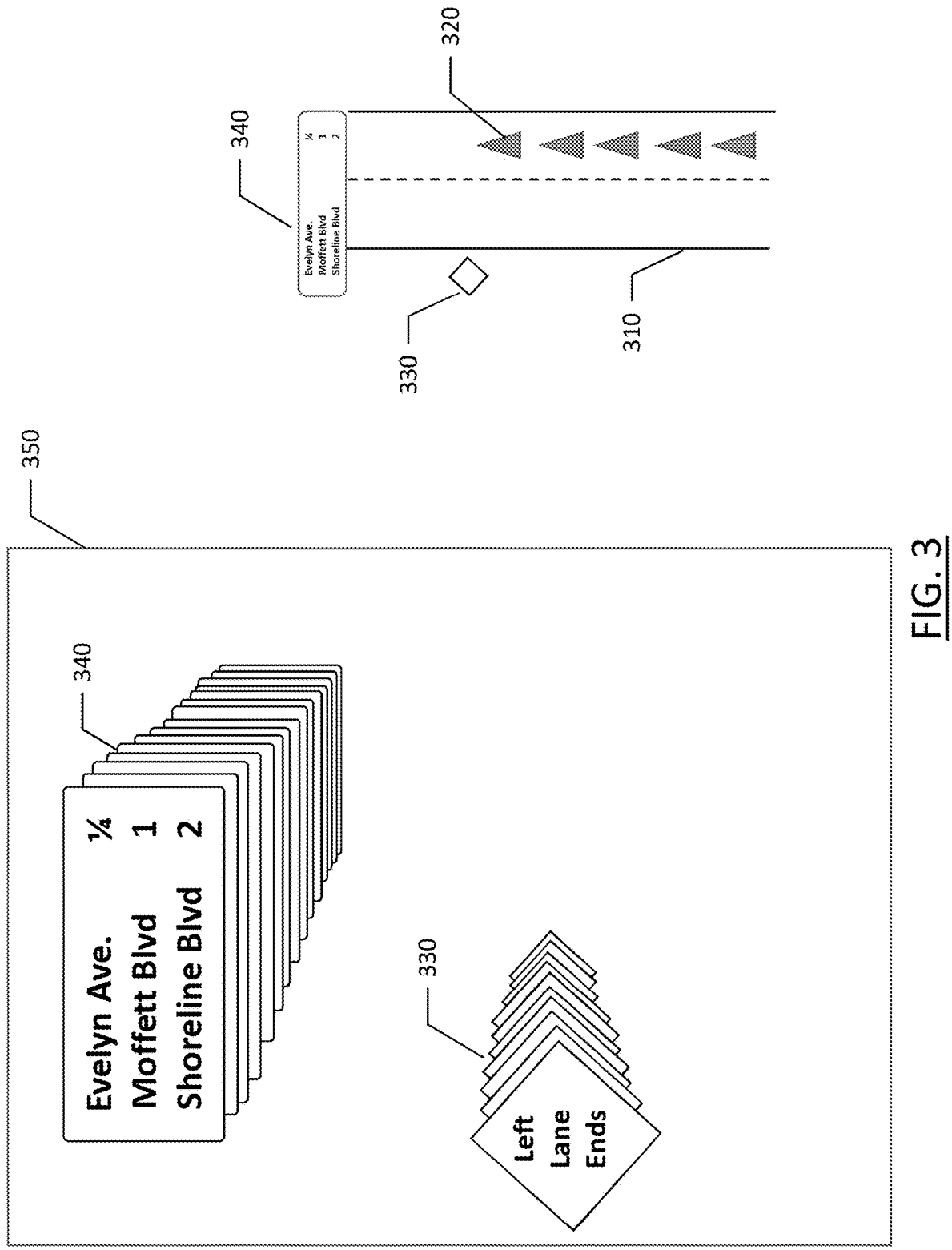
Figure 4:
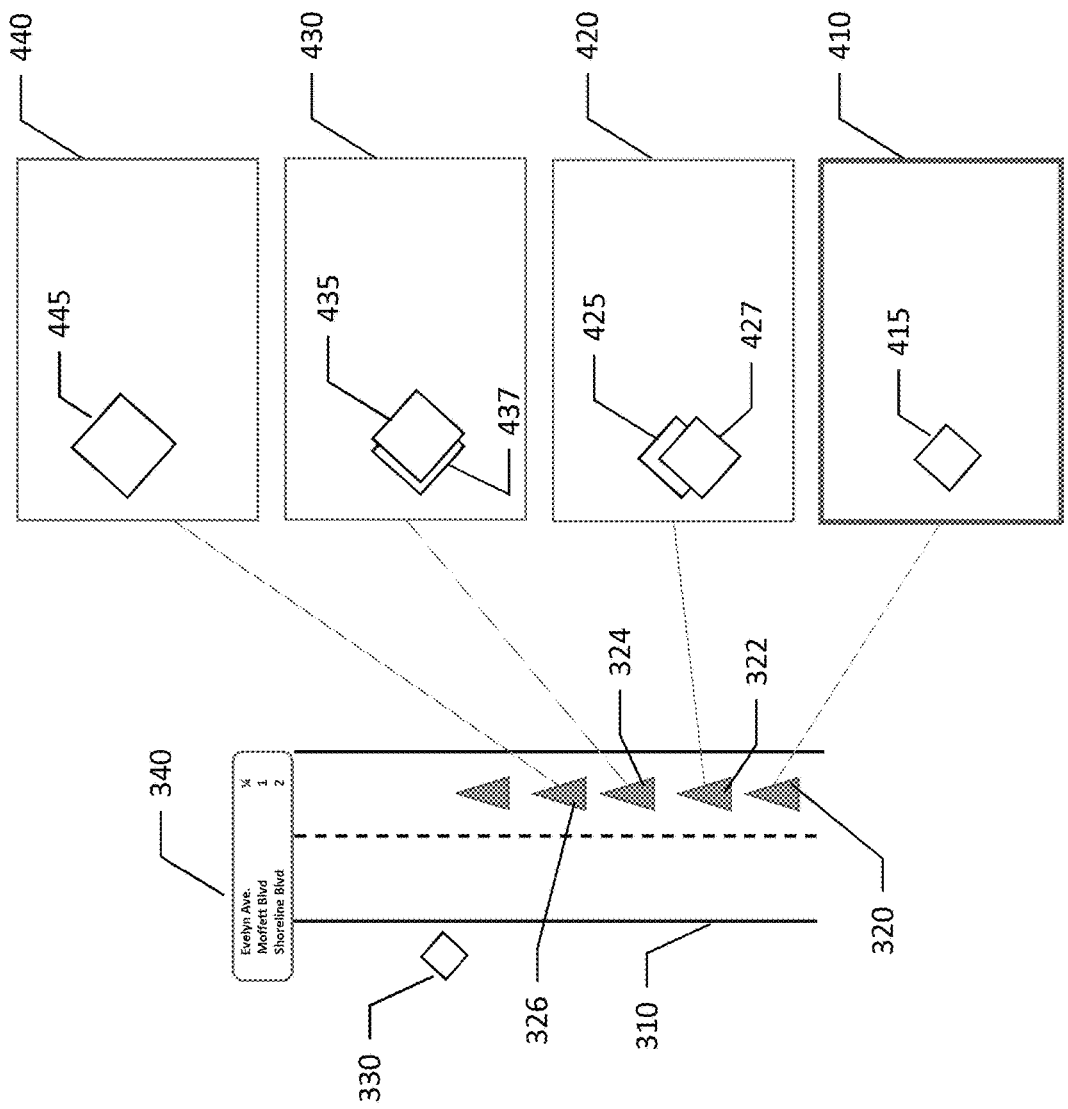
Figure 5:
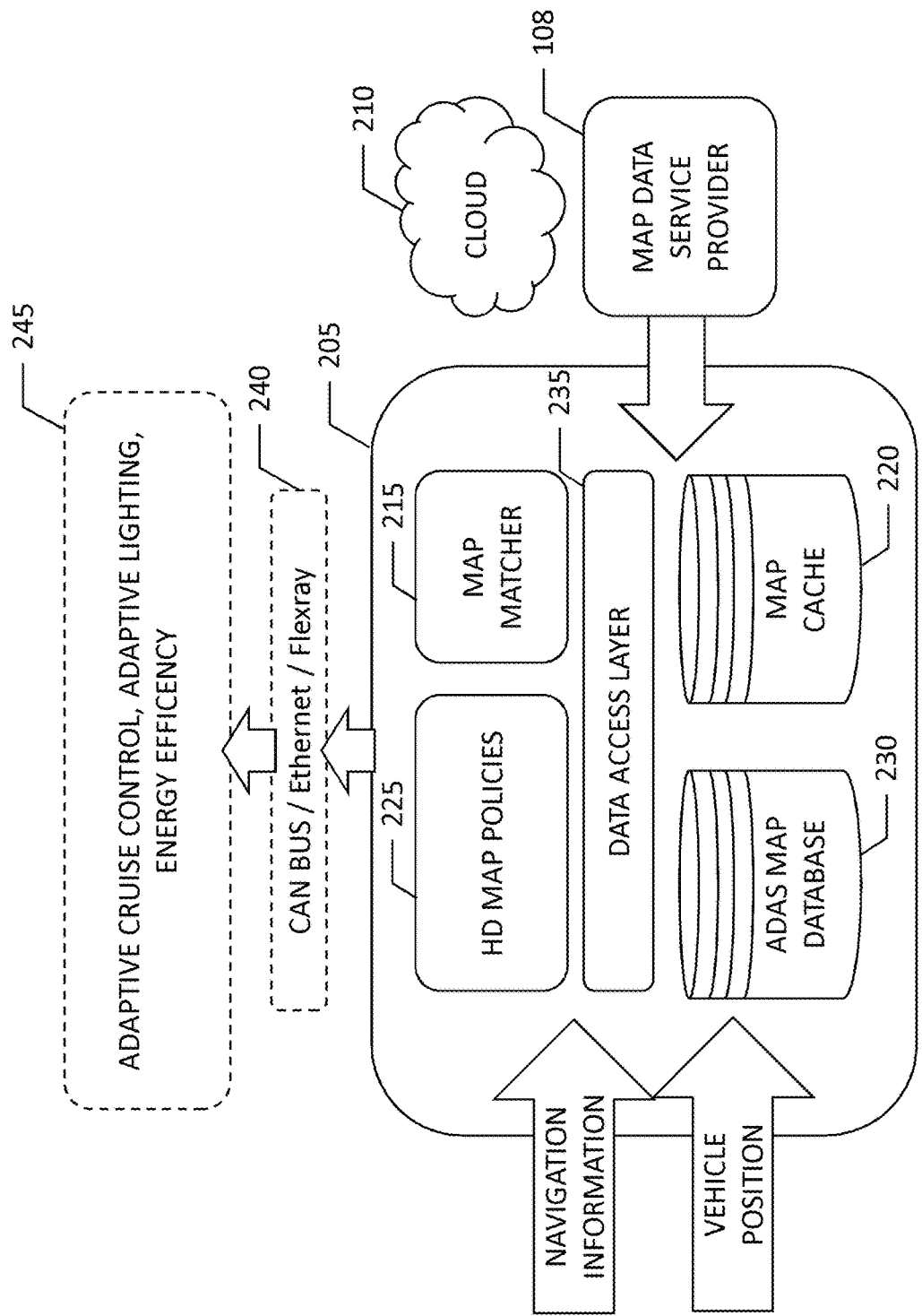
Figure 6:
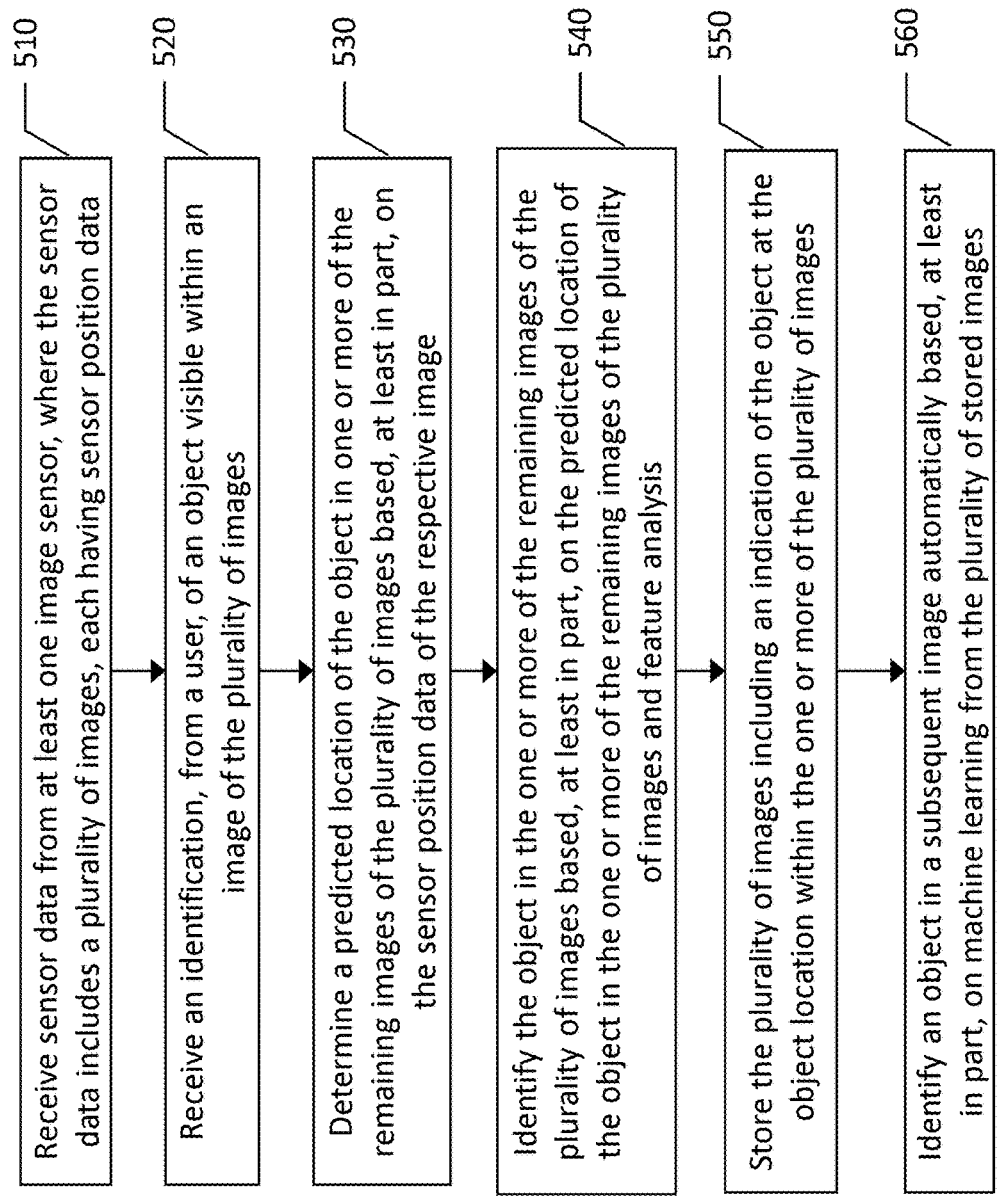

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating training data to facilitate automatically locating an object of interest within an image according to an example embodiment of the present disclosure;

FIG. 3 illustrates a frame including a plurality of features captured in images including the frame according to an example embodiment of the present disclosure;

FIG. 4 illustrates a series of images of an object captured at different positions along a road segment according to an example embodiment of the present disclosure;

FIG. 5 is a block diagram of a system for implementing the methods described herein generating training data to facilitate automatically locating an object of interest within an image and providing for autonomous control of a vehicle responsive thereto according to an example embodiment of the present disclosure; and FIG. 6 is a flowchart of operations for generating training data to facilitate automatically locating an object of interest within an image according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for perception system training for automatically detecting objects of interest in an environment. In the context of mapping, objects or features of interest in the environment may include lanes, signs, obstacles, etc. Perception systems may detect these features and objects in an environment and understand the features and objects in the context of the environment. In order for a perception system to reliably detect features and objects, large volumes of training data may be collected from a data capture platform and objects and features of images of the environment may be positively identified in order for the perception system to understand how to identify objects and features of the environment. Conventionally, humans may perform the positive identification of objects and features as manual labelers of objects and features in the images. Such manual labeling may include delineation of different signs on a per-frame basis, labeling a sequence of such signs as an image sensor travels along a road segment, capturing images of the environment. The sequence labeling task is central to collecting training data for the perception system.

A challenge with sequence labelling of objects and features within a sequence of images may include the repetitive nature of data from frame to frame. Images captured along a road segment may be repetitive and possibly redundant. Further, the data labeling efforts may be expensive to scale due to the manual labeling requirements, and human labelers may experience fatigue in labeling the same object that may be present in over a hundred sequential frames. Embodiments described herein include a learning technique to assist data labelers with an automated or semi-automated data labeling technique. Labelers can scale operations to focus on new object(s) that enter a scene and avoid having to label the same object repeatably in a sequence of images, and make minor corrections to the regions that may be incorrect.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing an advanced driver assistance features which may include a navigation system user interface. For example, the computing device may be an Advanced Driver Assistance System module (ADAS) which may at least partially control autonomous or semi-autonomous features of a vehicle; however embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped, associated or otherwise in communication with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate via various cellular or other wireless protocols including Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s).

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment may also be able to identify the lane based on the lane markings or other features that are observable. As such, the autonomous vehicle is equipped with sensors sufficient to observe road features, and a controller that is capable of processing the signals from the sensors observing the road features, interpreting those signals, and providing vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use high definition (HD) maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data file (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to road ways, while geographic information survey systems may provide information regarding areas beyond the road network. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to computer vision when there is a need to establish the identification and position of an object or feature within an environment, as may be beneficial to the generation and confirmation of HD maps facilitating autonomous or semi-autonomous vehicle control. For example, objects and features along a road segment may be detected through processing of sensor data through a perception system. A perception system may discern objects and features within an environment and be capable of efficiently locating and classifying the objects according to the type of object. However, in order to efficiently locate and classify objects, a perception system may require data from which object identification can be learned through a machine-learning technique in order to reliably and efficiently identify objects within an environment. The training data used for the machine-learning of a perception system may be produced according to example embodiments described herein using an online one-shot learning framework in which an object of interest is labeled manually in one of a plurality of frames, and the object is automatically identified in the remaining frames of the plurality of frames.

A "one shot" learning technique may greatly enhance the efficiency with which training data is generated for object identification by a perception system. The learning technique described herein may be used to learn the salient features and objects of interest to determine an object location within a sequence of images or frames. Further, motion information associated with the image sensor that captured the images/frames may be collected at the time of image capture or may be computed using visual odometry to propagate the labeled frame in the sequence. Manual intervention may only be needed for identifying the object in an initial frame/image, and for making minor corrections in egregious cases, thus greatly improving the efficiency with which labeling is performed of objects within an environment and enabling the labeling process to cover larger and more diverse datasets.

Sensor data may be generated from a vehicle traveling along a road segment where the sensor includes an image sensor or a distance sensor, such as a LiDAR sensor. The sensor data may capture a series of images of the environment of the sensor as the vehicle carrying the sensor travels along the road segment. The images captured by the sensor may be captured periodically, such as every several seconds, every second, every fraction of a second, etc. The images may optionally be captured based on a sensor refresh rate at which images can be reliably captured. Further, the periodic capturing of an image by the sensor may be time based or may be based on a speed of the vehicle carrying the sensor. For example, images may be captured more frequently as the vehicle travels faster since the environment of the vehicle will be changing more rapidly.

Detecting objects and features within captured sensor data of an environment may be difficult and may suffer from inherent bias based on the nature of the labeling efforts required to train such detectors. For example, a human labeler tasked with labelling objects in an image may manually mark the approximate corner of an observed sign in an image, while the true corner may be offset by a few pixels. Such errors, while they may be generally undiscernible from the context of a human observer, may manifest themselves as larger errors when such observed features are used to generate a map of the environment. Small errors in the detector may result in an inaccurate reconstruction of the detector outputs when building the map. When detectors are accurate, the resulting map is accurate. This is critical in the context of HD map construction from crowd-sourced data.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. The sensors may be used to capture sensor data within which objects are present. Certain objects detected by the sensors may be critical for facilitating autonomous control of a vehicle, such as roadway boundaries, lane lines, and road signs including information contained on the road signs. Detecting these features reliably and repeatably may be instrumental in autonomous vehicle control.

Object or feature detection using detectors that receive sensed data from a plurality of sensors may employ discrete-search techniques to approximate the location of an object, such as a sign. According to example embodiments described herein, sensor data is captured by sensors associated with one or more vehicles as they travel along a road segment. For a specific feature or object that is detected within sensed images, all images that have this feature may be considered to be a window of the detected feature over a plurality of images or frames. According to an example embodiment, the detected feature may be a road sign having a plane that is generally orthogonal to the road segment along which vehicles are traveling that detect the feature.

FIG. 3 illustrates an example embodiment in which a plurality of images is captured in which a specific feature is detected. In the illustrated embodiment, as a vehicle travels along a road segment 310, sensor data is captured periodically, such as at the sensor capture positions represented by triangles 320. The periodic sensor data capture is merely representative and may occur with a substantially higher frequency than represented by 320; however, the positions of 320 are shown as representative. As the vehicle travels along road segment 310, sensor data is captured of the environment. In the illustrated environment, two signs are present including sign 330 and sign 340. The frame 350 illustrates a plurality of images overlaid on one another depicting the position and size of the signs 330 and 340 as the vehicle travels along the road segment 310. As shown, the frequency of capture is higher than the representative positions 320, though the concept is apparent. In the captured images of the signs 330 and 340, the signs appear larger as they are approached by the vehicle, and the relative positions within the frame 350 change.

It is desirable that the objects, such as the signs 330 and 340, captured by the sensor data are automatically identified and located within the images or frames of sensor data. However, in order to automatically identify and locate objects in the sensor data accurately and repeatably, machine learning from accurate data may be used to "teach" systems described herein, such as the map data service provider 108 system or a perception system thereof how to identify and locate the objects. Embodiments described herein facilitate the machine learning by increasing the efficiency with which teaching data is generated for the system. Teaching data includes data with known and verified accuracy of information such that it can be relied upon for machine learning purposes. Manual labeling of objects and their locations within images is time consuming and arduous. Embodiments described herein reduce the manual labor and human interaction required to generate teaching data for the perception system by reliably and repeatably identifying objects in the sensor data and properly locating the objects within the images. Embodiments provide a distinct improvement in the field of machine learning computer technology by pre-computing training data such that the training data may only need confirmation, when appropriate, to verify that the training data is accurately determined by the automated system described herein. Methods described herein can reduce manual labeling requirements, such as by more than ninety percent in some embodiments, facilitating the generation of more training data, which in turn makes the perception system more accurate through machine learning.

The automated or semi-automated data-labeling strategy described herein begins with captured data, such as the plurality of images represented by frame 350 of FIG. 3. A user may label a single image including objects, such as signs 330 and 340. In this regard, the user labels a single image from among the plurality of images. The learning framework is used to learn classifiers for each object identified/labeled by the user. For the single labeled image, there is a single classifier per identified/labeled object. For the other images of the plurality of images, the classifiers are run to detect the objects identified in the single labeled image. The detected objects correspond to coarse estimates of the true location of the object within the image. Further, visual odometry or actual odometry from an inertial measurement system or wheel encoder may be used to predict the location of the object of interest along the entire sequence of the plurality of images. The classifier may be re-run with the predicted object location to refine the predicted location and to refine the output of the detector that identifies the objects in the images.

The output from the automated or semi-automated data labeling may be relatively accurate. However, as the plurality of images is training data for a perception system, it may be imperative that the objects are identified and located with a high degree of accuracy such that the perception system learning is as accurate as possible. To this end, a user may correct minor issues such as a slightly displaced corner of an object within the image. This tweaking of the processed plurality of images is a substantially faster and less laborious task since correction of the images may only be necessary on occasion, and the correcting process is considerably less labor intensive than the entire object identification and locating process that is conventionally a manual procedure.

FIG. 4 illustrates a correction process as described herein for correcting object identification or location within an image or a plurality of images. The road segment 310 of FIG. 4 is similar to that of FIG. 3, with sensor data capture locations illustrated as 320-326 as the vehicle progresses along the road segment. As shown, a first image 410 is illustrated as captured at 320, with the object (sign 330) visible within the image as 415. The image 410 of the illustrated embodiment is the one shot image that is manually labeled by a user to identify the object and the location of the object. The sensors of the vehicle capture a second image 420 at 322, a third image 430 at 324, and a fourth image 440 at 326.

As shown, since the object 415 was manually identified and located in image 410, the object is accurate and requires no changes. The object is propagated forward across the sequence of images using a motion model. The propagated objects are identified according to the classifier such that the object type is known and propagated accordingly. In image 420, the predicted location of the object 427 is offset from the actual location of the propagated object 425, such that manual correction is necessary. Similarly, the predicted location of the object 437 in image 430 is offset from the actual propagated location of the object 435 such that correction is needed. However, as shown in image 440, the actual location of the object 445 matches the predicted location of the object and no correction is necessary.

As shown in FIG. 4, the correlation of a predicted location and identity of an object within an image to an actual location and identity of an object in an image is substantially automated, with little manual interaction needed. This enables sequences of images to be labeled at a much faster rate than if the labeling was performed manually. As such, embodiments described herein provide an improvement in the field of processing machine learning training data. The ability to produce machine learning training data in a much shorter period of time with greater efficiency and accuracy while reducing the reliance on manual labor allows for more training data to be processed which, in turn, improves the quality of the machine learning of the perception system. Having more data from which to learn increases the reliability of the fully automated identification and locating of objects within a sequence of images.

According to example embodiments described herein, the role of HD maps in facilitating autonomous or semi-autonomous vehicle control may include crowd-sourced building of the maps to identify and confirm features and objects of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to establish the position of features detected along a road segment accurately and repeatably through the improved efficiency with which training data may be generated for perception systems to be able to automatically detect and locate features in an environment.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies 225 are applicable to the vehicle associated with the ADAS, including sensor capability information, autonomous functionality information, etc. Accordingly, policies for the vehicle are established based on the current location and the environmental conditions (e.g., traffic, time of day, weather). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region, such as in ADAS map database 230. The HD map policies 225 associated with the road segment may be provided to the vehicle control, such as via the CAN (computer area network) BUS (or Ethernet or Flexray) 240 to the electronic control unit (ECU) 245 of the vehicle to implement HD map policies 225, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects.

FIG. 6 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is a flowchart of a method for generating training data to facilitate automatically locating an object of interest within an image. As shown, at 510 sensor data is received from at least one image sensor, where the data includes a plurality of images, each having associated sensor position data. At 520, an identification is received from a user of an object visible within an image of the plurality of images. At least a portion of the object is visible in one or more of the remaining images, other than the one in which a user identified the object and location. A predicted location is determined at 530 of the object in the one or more of the remaining images based, at least in part, on the sensor position data of the respective image. The object is identified in the one or more of the remaining images at 540 based, at least in part, on the predicted location of the object in the one or more remaining images of the plurality of images and based on image feature analysis. The plurality of images is stored at 550 Including an indication of the object at the object location within the one or more of the plurality of images. At 560, an object in a subsequent image is identified based, at least in part, on machine learning from the plurality of images.

In an example embodiment, an apparatus for performing the method of FIG. 6 above may comprise a processor (e.g., the processor 24) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:
    receive sensor data from at least one image sensor, wherein the sensor data is representative of a plurality of images, wherein each image is associated with sensor position data;
    receive an identification, from a user, of an object visible within an image of the plurality of images, wherein at least a portion of the object is visible in one or more of the remaining images of the plurality of images;
    determine a predicted location of the object in the one or more of the remaining images of the plurality of images based, at least in part, on the sensor position data of the respective image, identify the object in the one or more of the remaining images of the plurality of images based, at least in part, on the predicted location of the object in the one or more of the remaining images of the plurality of images and image feature analysis;
    store the plurality of images including an indication of the object at an object location within the one or more of the plurality of images; and
    identify an object in a subsequent image automatically based, at least in part, on machine learning from the plurality of stored images, wherein the machine learning comprises pre-computed training data, wherein the pre-computed training data having verified accuracy of the object in the plurality of stored images.

2. The apparatus of claim 1, wherein the sensor position data comprises at least one of visual odometry or actual odometry from at least one sensor of the vehicle.

3. The apparatus of claim 2, wherein causing the apparatus to identify the object in one or more of the remaining images of the plurality of images based, at least in part, on the predicted location of the object in the one or more of the remaining images of the plurality of images and image feature analysis comprises causing the apparatus to identify the object location in the one or more of the remaining images of the plurality of images based on the at least one of visual odometry or actual odometry from the at least one sensor of the vehicle.

4. The apparatus of claim 1, wherein the apparatus is further caused to receive an indication of a correction, from the user, of the location of the object within at least one of the plurality of images relative to the predicted location of the object in the at least one of the plurality of images, wherein causing the apparatus to store the plurality of images including an indication of the object at the object location within the one or more of the plurality of images comprises causing the apparatus to store the at least one of the plurality of images including an indication of the object at a corrected location within the at least one of the plurality of images.

5. The apparatus of claim 1, wherein the apparatus is further caused to facilitate autonomous control of the vehicle based on identification of the object in the subsequent image automatically based, at least in part, on the machine learning from the plurality of images.

6. The apparatus of claim 1, wherein the at least one image sensor is associated with the vehicle traveling along a road segment, wherein the object comprises a road sign along the road segment.

7. The apparatus of claim 6, wherein the road sign comprises information regarding travel restrictions along the road segment, wherein the apparatus is further caused to provide for autonomous control of the vehicle based, at least in part, on the information of the road sign.

8. A computer program product comprising at least one non-transitory computer-readable storage medium having computer-executable program code instructions stored therein, the computer-executable program code instructions comprising program code instructions to:
    receive sensor data from at least one image sensor, wherein the sensor data is representative of a plurality of images, wherein each image is associated with sensor position data;
    receive an identification, from a user, of an object visible within an image of the plurality of images, wherein at least a portion of the object is visible in one or more of the remaining images of the plurality of images;
    determine a predicted location of the object in the one or more of the remaining images of the plurality of images based, at least in part, on the sensor position data of the respective image;
    identify the object in the one or more of the remaining images of the plurality of images based, at least in part, on the predicted location of the object in the one or more of the remaining images of the plurality of images and image feature analysis;
    store the plurality of images including an indication of the object at an object location within the one or more of the plurality of images; and
    identify an object in a subsequent image automatically based, at least in part, on machine learning from the plurality of stored images, wherein the machine learning comprises a pre-computed training data, wherein the pre-computed training data having verified accuracy of the object in the plurality of stored images.

9. The computer program product of claim 8, wherein the sensor position data comprises at least one of visual odometry or actual odometry from at least one sensor of the vehicle.

10. The computer program product of claim 9, wherein the program code instructions to identify the object in one or more of the remaining images of the plurality of images based, at least in part, on the predicted location of the object in the one or more of the remaining images of the plurality of images and image feature analysis comprises program code instructions to identify the object location in the one or more of the remaining images of the plurality of images based on the at least one of visual odometry or actual odometry from the at least one sensor of the vehicle.

11. The computer program product of claim 8, further comprising program code instructions to receive an indication of a correction, from the user, of the location of the object within at least one of the plurality of images relative to the predicted location of the object in the at least one of the plurality of images, wherein the program code instructions to store the plurality of images including an indication of the object at the object location within the one or more of the plurality of images comprises program code instructions to store the at least one of the plurality of images including an indication of the object at a corrected location within the at least one of the plurality of images.

12. The computer program product of claim 8, further comprising program code instructions to facilitate autonomous control of the vehicle based on identification of the object in a subsequent image automatically based, at least in part, on the machine learning from the plurality of images.

13. The computer program product of claim 8, wherein the at least one image sensor is associated with the vehicle traveling along a road segment, wherein the object comprises a road sign along the road segment.

14. The computer program product of claim 13, wherein the road sign comprises information regarding travel restrictions along the road segment, wherein the computer program product further comprises program code instructions to provide for autonomous control of the vehicle based, at least in part, on the information of the road sign.

15. A method comprising:
receiving sensor data from at least one image sensor, wherein the sensor data is representative of a plurality of images, wherein each image is associated with sensor position data;
receiving an identification, from a user, of an object visible within an image of the plurality of images, wherein at least a portion of the object is visible in one or more of the remaining images of the plurality of images;
determining a predicted location of the object in the one or more of the remaining images of the plurality of images based, at least in part, on the sensor position data of the respective image;
identifying the object in the one or more of the remaining images of the plurality of images based, at least in part, on the predicted location of the object in the one or more of the remaining images of the plurality of images and image feature analysis;
storing the plurality of images including an indication of the object at an object location within the one or more of the plurality of images; and
identifying an object in a subsequent image automatically based, at least in part, on machine learning from the plurality of stored images, wherein the machine learning comprises a pre-computed training data, wherein the pre-computed training data having verified accuracy of the object in the plurality of stored images.

16. The method of claim 15, wherein the sensor position data comprises at least one of visual odometry or actual odometry from at least one sensor of the vehicle.

17. The method of claim 16, wherein identifying the object in one or more of the remaining images of the plurality of images based, at least in part, on the predicted location of the object in the one or more of the remaining images of the plurality of images and image feature analysis comprises identifying the object location in the one or more of the remaining images of the plurality of images based on the at least one of visual odometry or actual odometry from the at least one sensor of the vehicle.

18. The method of claim 15, further comprising receiving an indication of a correction, from the user, of the location of the object within at least one of the plurality of images relative to the predicted location of the object in the at least one of the plurality of images, wherein storing the plurality of images including an indication of the object at the object location within the one or more of the plurality of images comprises storing the at least one of the plurality of images including an indication of the object at a corrected location within the at least one of the plurality of images.

19. The method of claim 15, further comprising facilitating autonomous control of the vehicle based on identification of the object in a subsequent image automatically based, at least in part, on the machine learning from the plurality of images.

20. The method of claim 15, wherein the at least one image sensor is associated with the vehicle traveling along a road segment, wherein the object comprises a road sign along the road segment.

* * * * *